United States Patent [19]

Werner et al.

[11] Patent Number: 4,836,576
[45] Date of Patent: Jun. 6, 1989

[54] SAFETY STEERING WHEEL

[75] Inventors: Heribert Werner, Kahl; Klaus Grothe, Aschaffenburg; Martin Kreuzer, Kleinwallstadt, all of Fed. Rep. of Germany

[73] Assignee: Kolbenschmidt Aktiengesellschaft, Neckarsulm, Fed. Rep. of Germany

[21] Appl. No.: 164,278

[22] Filed: Mar. 4, 1988

[30] Foreign Application Priority Data

Mar. 7, 1987 [DE] Fed. Rep. of Germany ....... 3707370

[51] Int. Cl.⁴ ............................................ B60R 21/16
[52] U.S. Cl. ..................................... 280/731; 280/743
[58] Field of Search ............... 280/731, 732, 728, 743, 280/730

[56] References Cited

U.S. PATENT DOCUMENTS

| | | | |
|---|---|---|---|
| 4,097,064 | 6/1978 | Ikawa et al. | 280/732 |
| 4,148,503 | 4/1979 | Shiratori et al. | 280/731 |
| 4,325,568 | 4/1982 | Clark et al. | 280/731 |

FOREIGN PATENT DOCUMENTS 3116538 11/1982 Fed. Rep. of Germany ...... 280/732

*Primary Examiner*—Charles A. Marmor
*Assistant Examiner*—Karin Tyson
*Attorney, Agent, or Firm*—Sprung Horn Kramer & Woods

[57] ABSTRACT

A safety steering wheel having an impact protector mounted on the hub of the steering wheel and which consists of a collapsed gas bag and a housing which contains a propellant for inflating the gas bag. The impact protector is covered by a cover hood, which is made of soft elastic plastic and reinforced by a reinforcing layer. In order to prevent a bulging of the cover hood by the forces which are exerted by the collapsed gas bag, a frame is provided, which is secured to the carrier for the housing which contains the propellant. The frame surrounds the housing and the gas bag and comprises at least one retaining member, which is integrally joined to the frame and attached to that edge of the frame which faces the driver's compartment. The retaining member when in a rest position extends in front of the collapsed gas bag and in the case of an impact is adapted to be bent up toward the driver's compartment along a straight line. A reinforcing layer is provided, which is made of hard plastic and covers the gas bag, wherein the rated breaking line of the cover hood that is connected to the frame and extends along those sides of the reinforcing layer which are not directly connected to the retaining member.

11 Claims, 1 Drawing Sheet

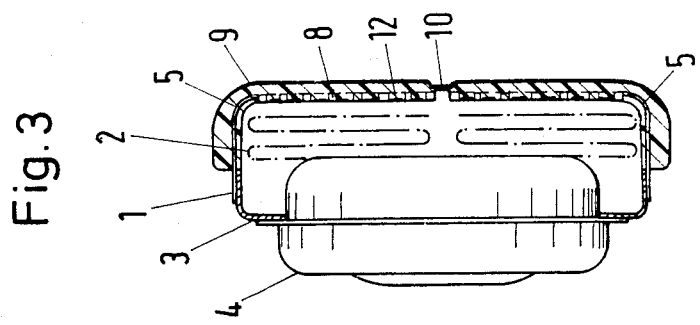
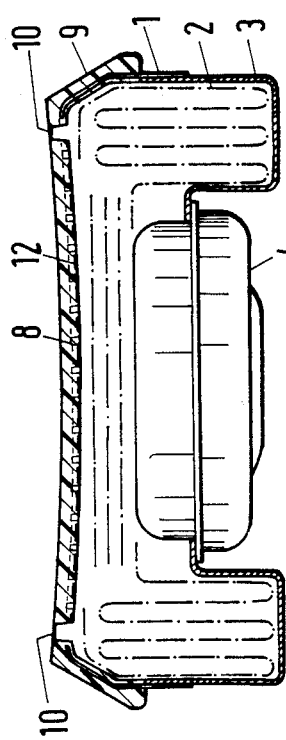
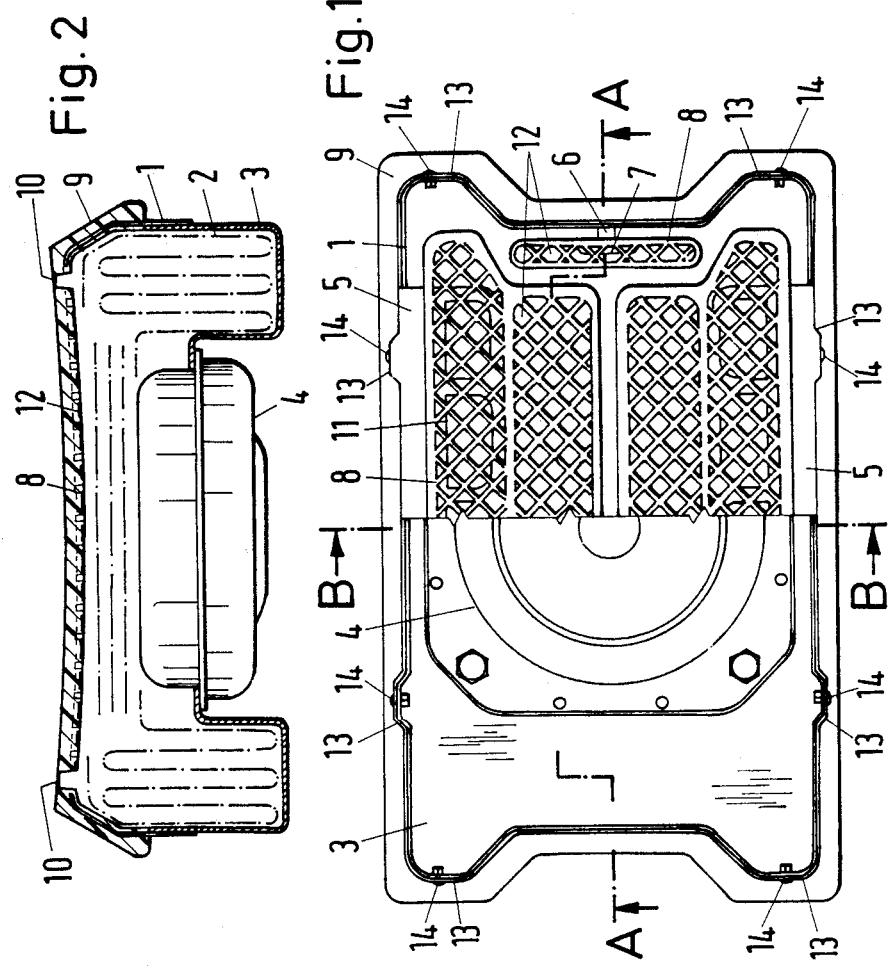

SAFETY STEERING WHEEL

BACKGROUND OF THE INVENTION

This invention relates to a safety steering wheel comprising a cover made of soft elastic plastic and an impact protector which is provided on the hub of the steering wheel and consists of a gas bag, which is collapsed in a position of rest and in response to an impact is suddenly inflatable by means of a compressed gas which is adapted to be produced by a propellant that is accommodated in a housing, and a cover hood which is disposed over the gas bag and is made of soft elastic plastic, in which a reinforcing layer is embedded and which has a rated breaking line.

Such a cover hood serves not only to protect the collapsed gas bag and the housing which contains the propellant for inflating the gas bag but is also intended to have a reasonably pleasing appearance. It is known to provide such cover hoods which have a soft elastic plastic layer, which preferably consists of polyurethane foam and is reinforced by woven fabric inserts made of nylon yarns and which has one or more rated breaking lines, along which the plastic layer is torn in response to the activation of the impact protector. The cover hood has on its inside surface an annular peripheral undercut, which receives a suitable shoulder of the carrier for the housing which contains the propellant. To avoid an automatic separation of the cover hood from the carrier for the housing in case of an activation of the impact protector, it is necessary to provide a additional metal strip and to clamp the edge of the cover hood in position between said additional metal strip and the oppositely disposed carrier for the housing which contains the propellant.

Since the woven fabric insert by which the cover hood is reinforced consists of a plurality of individual parts, which are made of nylon yarns and have been sewn to each other, it is rather difficult in general to always provide the woven fabric insert in a precisely fitting manner and there is a rather high reject quota. Besides, the placing of the woven fabric insert into the mold during the molding of the cover hood made of soft elastic plastic requires a relatively long time and relatively long standstill periods of the molding machine. Another disadvantage resides in the fact that the reinforcing layer consisting of a woven fabric insert cannot prevent a bulging of the plastic hood under the action of forces exerted by the collapsed gas bag.

SUMMARY OF THE INVENTION

It is an object of the invention to provide, for the cover hood, a reinforcing layer which has an exactly reproducible, fitting shape and which can be manufactured with relatively simple means and can be placed within a relatively short time into the mold in which the soft elastic plastic is molded around the reinforcing layer. Besides, the reinforcing layer should permanently prevent a bulging of the cove hood.

That object is accomplished in that a frame is provided, which is secured to the carrier for the housing which contains the propellant, said frame surrounds the housing and the gas bag and comprises at least one retaining member which is integrally joined to the frame and attached to that edge of the frame which faces the driver's compartment, said retaining member when in position of rest extends in front of the collapsed gas bag and in case of an impact is adapted to be bent up toward the driver's compartment along a straight line, and a reinforcing layer is provided, which is made of hard plastic, such as a thermoplastic and covers the gas bag, wherein the rated breaking line of the cover hood that is connected to the frame extends along those sides of said reinforcing layer which are not directly connected to the retaining member. In response to an activation of the impact protector, the plastic layer of the cover hood is torn along the rated breaking line, the retaining member and the plastic reinforcing layer secured to said member are bent up toward the driver's compartment and the gas bag emerges into the driver's compartment.

A plurality of retaining members are desirably attached to that edge of the frame which faces the driver's compartment and are integrally joined to the frame by narrow webs.

To ensure that the soft elastic plastic layer can be firmly joined to the reinforcing layer of plastic, the latter is formed with numerous apertures, which preferably consist of regularly arranged holes, and the reinforcing layer suitably constitutes a network. The plastic can flow through the apertures to that side of the reinforcing layer which faces the steering column and can form a continuous layer on that side.

To ensure that plastic portions of the reinforcing layer joined to the retaining members will not detach from the retaining members upon an activation of the impact protector, the retaining members are formed with apertures in which the plastic of the reinforcing layer is held.

The apertures of the retaining members have such a size that the weight of the frame is minimized and the appearance of the cover hood will not be marked by a deformation of the soft elastic plastic in adaptation to the apertures.

The frame is connected by conventional fastening elements, preferably blind rivets or screws, to the carrier for the housing which contains the propellant. In a special embodiment the frame is provided with outwardly facing indentations and those portions of the fastening elements which are directed toward the gas bag protrude into said indentations so that a damage to the gas bag by the fastening elements is precluded.

The frame and the retaining members attached to it preferably consist of sheet metal in a thickness of from 0.5 to 1.5 mm.

The frame has either been formed by deep drawing or has been made from a stamped sheet metal strip, which has been shaped to have a suitable shape and has been soldered and/or welded.

The advantages afforded by the invention reside particularly in that the frame, the retaining members which are integrally joined to the frame by webs, and the reinforcing layers which are secured to the retaining members and consist of hard plastic can be exactly made to predetermined dimensions and can be easily placed into the mold which is used to mold the soft elastic plastic layer. Besides, the frame can be molded in a shape which will conform to a cover hood having any desired shape. The retaining members, which extend in front of the gas bag in a position of rest, and the reinforcing layers secured to said retaining members, will very effectively prevent a bulging of the cover hood under the action of forces exerted by the collapsed gas bag.

The invention is illustrated by way of example in the drawing and will be described more in detail hereinafter.

BRIEF DESCRIPTION OF THE DRAWING

FIG. 1 is a top plan view showing the impact protector with the retaining members shown broken away and the reinforcing layers secured thereto according to the invention.

FIG. 2 is a sectional view taken along section line A—A in FIG. 1.

FIG. 3 is a sectional view taken on section line B—B in FIG. 1.

DETAILED DESCRIPTION OF THE INVENTION

Referring to FIGS. 1-3, the substantially rectangular frame 1 consists of sheet steel with a thickness of 0.75 mm and has been formed by deep drawing. The frame 1 surrounds the impact protector, which consists of the collapsed gas bag 2 and a carrier 3 for the housing 4, which contains a propellant for inflating the gas bag 2.

A retaining member 5 is attached to each of the two mutually opposite longitudinal bars of the frame 1 at that edge of said bar which faces the driver's compartment. The retaining members are integrally joined to the frame 1 by webs, not shown.

A retaining member 7 is provided at the edge of each of the end bars of the frame and is joined integrally to the frame 1 by a web 6. A reinforcing layer 8 for the covering 9 consisting of polyurethane foam is firmly joined to each of the retaining members 5, 7 and is made of polyamide.

The frame 1 and the retaining members 5, 7 are integrally joined and comprise sheet metal having a thickness of from 0.5 to 1.5 mm. The frame 5 is formed from a stamped sheet metal sheet to a suitable shape and has been soldered or welded.

Along those sides of the reinforcing layer 8 which are not joined to the retaining members 5, 7, the cover 9 is relatively thin-walled and contains no reinforcement so that the rated breaking lines 10 extend along said regions.

The retaining members 5, 7 and the reinforcing layers 8 are formed with apertures 11, 12 so that the polyamide of the reinforcing layer and the polyurethane foam layer of the covering will be held and will be anchored more effectively.

The cover 9 may cover the reinforcing layer also on the side facing the steering column. The frame 1 is provided with a plurality of indentations 13 and the blind rivets 14, by which the frame 1 is connected to the carrier 3, protrude into the indentations 13 with those portions of the rivets which are directed toward the gas bag.

It will be appreciated that the instant specification and claims are set forth by way of illustration and not limitation, and that various modifications and changes may be made without departing from the spirit and scope of the present invention.

What is claimed is:

1. In a safety steering wheel comprising a cover composed of soft elastic plastic and an impact protector on a hub of the steering wheel and including a gas bag in a collapsed rest position, means for inflating the bag in response to an impact, a housing for the inflating means and the cover disposed over the gas bag and composed of soft elastic plastic and an embedded reinforcing layer having a rated breaking line, the improvement comprising: a carrier for the housing, a frame secured to the carrier and surrounding the housing and the gas bag and having a plurality of retaining members integrally joined to the frame and wherein at least one retaining member is attached to an edge of the frame facing a driver and is bendable from a rest position wherein it extends in front of the collapsed gas bag in its rest position to a position toward a driver along a straight line when the bag is inflated, wherein the reinforcing layer is connected to the at least one retaining member and is composed of hard plastic and the rated breaking line of the cover extends along sides of said reinforcing layer, said retaining members being disposed over the gas bag to an extent which is considerably less than the upper surface of the entire gas bag in its collapsed rest position.

2. A steering wheel according to claim 1, wherein the retaining members are integrally connected to the frame by narrow webs.

3. A steering wheel according to claim 2, wherein the retaining members have apertures.

4. A steering wheel according to claim 1, wherein the frame has outwardly projecting indentations and fastening elements connecting the frame to the carrier and protruding into said indentations.

5. A steering wheel according to claim 1, wherein the reinforcing layer has apertures.

6. A steering wheel according to claim 5, wherein the apertures consist of regularly arranged holes.

7. A steering wheel according to claim 5, wherein the reinforcing layer comprises a network.

8. A steering wheel according to claim 1, wherein the frame and the retaining members are integrally joined and comprise sheet metal having a thickness of from 0.5 to 1.5 mm.

9. A steering wheel according to claim 8, wherein the frame is formed by deep drawing.

10. A steering wheel according to claim 8, wherein the frame is formed from a stamped sheet metal strip, to a suitable shape and has been soldered or welded.

11. A steering wheel according to claim 1, wherein the reinforcing layer is a stiff layer.

* * * * *

UNITED STATES PATENT AND TRADEMARK OFFICE
CERTIFICATE OF CORRECTION

PATENT NO. : 4,836,576

DATED : June 6, 1989

INVENTOR(S) : Werner et al.

It is certified that error appears in the above-identified patent and that said Letters Patent is hereby corrected as shown below:

Col. 4, line 34      After "claim" delete "2" and substitute --1--

Col. 4, line 53      After "strip" delete ","

Signed and Sealed this

Seventeenth Day of July, 1990

Attest:

HARRY F. MANBECK, JR.

*Attesting Officer*       Commissioner of Patents and Trademarks